Patented Dec. 6, 1949

UNITED STATES PATENT OFFICE 2,490,337

PREPARATION OF KETALS

Willard J. Croxall, Bryn Athyn, and Harry T. Neher, Bristol, Pa., assignors to Röhm & Haas Company, Philadelphia, Pa., a corporation of Delaware No Drawing. Application September 24, 1947, Serial No. 775,976

6 Claims. (Cl. 260—615)

This invention deals with a method for preparing ketals. It concerns a process wherein isopropenyl acetate,

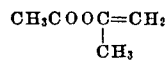

is reacted with a primary or a secondary alcohol in the presence of a mercury compound and a strongly acidic catalyst. In the reaction, two moles of such an alcohol are reacted with the isopropenyl acetate and one mole of acetic acid is liberated along with a mole of a ketal.

As is known, ketals are seldom obtained directly from ketones and alcohols. They are more readily obtained from esters of orthoformic or orthosilicic acids by reaction of ketones therewith. This method presents difficulties, however, in the preparation of the esters of the ortho acids. A few ketals have been made from substituted acetylenes, but this method does not appear to be one which is widely applicable. It, like the previous method, requires preparation of troublesome intermediates.

In contrast to the difficulties of previously known methods, the process of this invention permits the preparation of a great variety of ketals without particular complication in a relatively pure form and in generally satisfactory yields. According to this process, isopropenyl acetate and an alcohol are reacted by mixing at temperatures of 0° to 75° C., preferably 25° to 50° C., in the presence of small amounts of a mercury catalyst and a strongly acidic catalyst. The acidic catalyst is destroyed and the ketal isolated.

As an alcohol, R'OH, there may be here used any organic compound containing a non-tertiary alcoholic hydroxyl group and containing no interfering group which reacts with or destroys the acidic catalysts, such as amino groups. It is thus possible to prepare a great variety of ketals.

The alcohols may be aliphatic, arylaliphatic, cycloaliphatic, or heterocyclic aliphatic alcohols in which the alcoholic hydroxyl group is attached to a primary carbon atom, —CH$_2$—, or a secondary carbon atom, —CH=, which is aliphatic in nature.

Typical aliphatic alcohols which may be used include straight and branched chained alcohols, saturated and unsaturated alcohols of open chain structure which are non-tertiary alcohols, i. e., primary and secondary alcohols. These include such alcohols as methyl, ethyl, propyl, isopropyl, n-butyl, sec.-butyl, iso-butyl, the various primary and secondary amyl, hexyl, octyl, decyl, dodecyl, or higher alcohols, including myristyl, cetyl, and stearyl. Also included are allyl, methallyl, crotyl, undecenyl, and oleyl alcohols. Useful alcohols having a cycle in their structures include benzyl, phenylethyl, methylbenzyl, tert.-butylbenzyl, and the like, cyclohexanol, methylcyclohexanol, hexahydrobenzyl alcohol, terpineols, hydroabietyl alcohol, hydroxydihydronordicyclopentadiene, etc. Another subclass of considerable interest is composed of alcohols containing an inert functional group or neutral group such as an ether or ester group. Members of this subclass include methoxyethanol, ethoxyethanol, butoxyethanol, octoxyethanol, methoxyethoxyethanol, butoxyethoxyethanol, methoxypropanol, ethoxypropanol, butoxypropoxypropanol, alloxyethanol, methalloxyethanol, phenoxyethanol, phenoxypropanol, cresoxyethanol, octylphenoxyethanol, tetrahydrofurfuryl alcohol, and such hydroxy esters as methyl glycolate, ethyl hydracrylate, methyl lactate, ethyl lactate, butyl glycolate, butyl hydracrylate, butyl lactate, octyl glycolate, ethyl α-hydroxybutyrate, methyl β-hydroxybutyrate, and other esters, particularly of α- or β-hydroxy monocarboxylic acids, preferably those of two to four carbon atoms.

While monohydric alcohols are preferred, the reaction is not confined thereto. Reaction results between isopropenyl acetate under the prescribed conditions with polyhydric alcohols. Ethylene and propylene glycols give cyclic ketals. Longer-chained glycols and other polyhydric alcohols react to give ketal-type products of large molecular size.

For promoting the reaction between isopropenyl acetate and alcohol, there must be present a mercury catalyst and a strongly acidic catalyst. A convenient mercury compound of excellent activity is mercury oxide, although this compound alone is not effective. It must be used in conjunction with a strong mineral acid such as sulfuric acid or tetraphosphoric acid or an "ansolvo" acid, illustrated by the highly effective complexes formed by boron trifluoride and oxygenated compounds, such as alcohols, ethers, ketones, carboxylic acids, and the like. Mercury oxide and acid together form in situ a most effective catalytic combination in a highly active form which, for practical purposes, may be regarded as both a mercury catalyst and a strongly acidic catalyst.

It is not essential, however, that the combination be formed in situ, for preformed mercury salts, such as the sulfate or phosphate, which themselves can yield a strong acid, as by hydrolysis, may be used. Mercuric chloride also promotes the desired reaction, but its action is is not so rapid as the combination of mercury catalyst and acid. Other effective catalysts have been found to be mercury acetate-sulfate and mercury acetate-trichloroacetate.

Complexes formed with boron trifluoride are especially valuable acidic catalysts when used in conjunction with a mercury compound, particularly mercury oxide. Such complexes are readily dissolved by the reaction mixture, produce no troublesome by-products, and are readily disposed of at the end of the reaction. Typical co-ordination complexes of boron trifluoride and an oxygenated organic compound are $BF_3.O(C_2H_5)_2$, $BF_3.O(C_4H_9)_2$, $BF_3.2CH_3COOH$, $BF_3.C_2H_5OH$, $BF_3.C_4H_9OH$, $BF_3.CH_3COCH_3$, etc.

Only catalytic amounts of mercury compound and of strongly acidic catalyst are needed for promoting the desired reaction. As small amounts as a half gram each of a mercury compound and an acid catalyst per gram mole of isopropenyl acetate are sufficient to give rapid conversions and fair yields. Both smaller amounts, such as 0.1 gram per gram mole of the acetate, and larger amounts of mercury compound and strongly acidic catalyst may be used. One-gram portions of each per gram mole of isopropenyl acetate appear to give about optimum results in respect to both rate of reaction and yield with due respect for economy of time, materials, and effort. Higher proportions may, however, be used, even ten-gram portions per gram mole of isopropenyl acetate being effective and, in the case of the less reactive alcohols, sometimes helpful.

The optimum ratio of isopropenyl acetate to alcohol is about the theoretical one of one mole of the former to two moles of the latter. But this ratio need not be strictly adhered to, both smaller and larger ratios being permissible. With ratios such as one to one, it is best to add isopropenyl acetate to alcohol. On the other hand, ratios with larger proportions of alcohol are often desirable, the excess alcohol serving as a convenient solvent. Other inert organic solvents may, however, be used, such as hydrocarbons and chlorinated solvents.

After the reaction has been effected, the acidic catalyst is destroyed, as by addition of an alkaline reacting material, such as a dilute caustic solution, sodium or potassium carbonate or bicarbonate, calcium carbonate, etc. It is best to bring the reaction mixture to neutrality or to render it slightly alkaline. The ketals may then be separated by distillation, extraction, or by other convenient method.

By this method, there are obtained not only known ketals but also ketals which have not hitherto been prepared or known. They are useful as chemical intermediates, being reactive compounds. They are also useful as solvents, softeners, and plasticizers.

Typical preparations of ketals are shown in the following examples.

*Example 1*

Into a three-necked flask equipped with mercury-sealed stirrer, thermometer, dropping funnel, and reflux condenser, there were placed 148 parts by weight of n-butanol, one part of mercuric oxide, and one part of the boron trifluoride complex of diethyl ether. Thereto there was slowly added one hundred parts of isopropenyl acetate. During the time required for addition, the temperature of the reaction mixture was held at 35°–38° C. by external cooling. The reaction mixture was well stirred for a half hour after all of the isopropenyl acetate had been added. It was then poured with stirring into 350 parts of water to which fifty-three parts of soda ash had been added. An oil layer formed which was separated, dried over anhydrous potassium carbonate, and distilled with fractionation. There was obtained a fraction amounting to 116 parts of a liquid which corresponded in chemical composition with that of di-n-butyl ketal. It boiled at 64°–64.5° C./3 mm. and showed the following constants: Refractive index, $n_D^{20}$, of 1.4120; density, $d_{20}^{20}$, 0.8456, and molecular dispersion, $M_D$, (observed) 55.42, compared with 56.28 as a calculated value.

Replacement of butyl alcohol with a lower or higher alcohol leads to corresponding ketals. For example, when the reaction is performed with dodecyl alcohol at temperatures of 45° to 50° C., there is obtained dodecyl ketal, boiling at 200° C./1–3 mm.

*Example 2*

There were placed in the reaction vessel ninety-two parts of ethanol, two parts of mercuric oxide, and two parts of the boron trifluoride complex of methanol. Thereto was added over the course of fifty minutes one hundred parts of isopropenyl acetate. The temperature was not allowed to rise above 40° C. by application of an ice bath to the reaction vessel. Stirring was continued for forty minutes after the addition of isopropenyl acetate without any effort to control temperature. The reaction mixture was then stirred into an excess of a saturated solution of sodium carbonate. An oil formed and was separated. The aqueous layer was extracted with ethyl ether, and extract and oil were combined. The ether solution was dried over anhydrous potassium carbonate and the ether removed under reduced pressure. The product was then distilled at 110° to 111° C. to give practically pure diethyl ketal.

In the same way, dimethyl ketal may be formed and purified by distillation at 80°–83° C.

*Example 3*

Isopropenyl acetate (two hundred grams) was added to a rapidly stirred mixture of four grams of mercury oxide, four grams of the complex of boron trifluoride and methanol, and 232 grams of allyl alcohol. The temperature was held below 40° C. by external cooling. The reaction mixture was then poured into a cold aqueous solution containing excess sodium carbonate. An oil formed, was separated, dried over potassium carbonate, and distilled. The fraction obtained at 90° to 92° C. at 90 mm. corresponded in composition to diallyl ketal. It had a refractive index, $n_D^{20}$, of 1.4300. It gave a polymer when heated with a little benzoyl peroxide.

*Example 4*

To a mixture of 232 parts of allyl glycolate, two parts of mercuric oxide, and two parts of $BF_3.O(C_4H_9)_2$, there was added during the course of a half hour one hundred parts of isopropenyl acetate. The temperature rose to 40° to 50° C. and was prevented from going higher by use of an external water bath. After the isopropenyl acetate had been added, the reaction mixture was stirred without cooling, heat being evolved for about a half hour. The reaction mixture was then cooled and poured into an equal volume of water. This mixture was then neutralized with potassium carbonate. An oil layer formed and was separated. After it was dried over a little potassium carbonate, it was fractionated under reduced pressure. The fraction passing over at 120°–145° C./2 mm. corresponded in composition to bis(allyl glycolate) ketal.

*Example 5*

Into a mixture of 260 parts of allyl hydracrylate, two parts of mercury oxide, and two parts of boron trifluoride-methanol complex, there was run 102 parts of isopropenyl acetate. The reaction started slowly and required over an hour with good stirring for the initial phase of the reaction. The reaction mixture was then cautiously stirred and heated to 60°–65° C. It was then cooled and treated with a little solid potassium carbonate and poured into water. An oil formed. It was separated, dried over potassium carbonate, and distilled under reduced pressure. The fraction taken off between 120° C./2 mm. and 145° C./1 mm. contained the desired bis(allyl hydracrylate) ketal.

*Example 6*

To a mixture of 138 grams of phenoxyethanol, one gram of mercury oxide, and one cubic centimeter of the boron trifluoride-methyl alcohol complex, there was slowly added one hundred grams of isopropenyl acetate. The temperature was kept at 40°–45° C. at first and then was carried to 60° C. while the reaction mixture was stirred. It was then cooled and treated with sodium bicarbonate. The liquid was separated from the solid, washed with a little soda ash solution, dried over potassium carbonate, and distilled under reduced pressure. The fraction obtained at 80°–90° C./1–2 mm. contained the desired bis(phenoxyethyl) ketal.

In the same way, other ether alcohols may be used in place of the phenoxyethanol of the last example with production of corresponding ketals. In addition to ether alcohols mentioned above to illustrate typical compounds which react with isopropenyl acetate, there may be used cetyloxyethanol, oleyloxyethanol, undecenyloxyethoxyethanol, dodecyloxypropanol, dodecyloxyethoxyethanol, octyloxypropoxyethanol, octyloxyethoxyethoxyethanol, butoxyethoxyethoxyethoxyethanol, cyclohexyloxyethoxyethoxyethanol, benzyloxyethoxyethanol, hexahydrobenzyloxyethoxyethoxyethanol, butylbenzyloxyethoxyethoxyethanol, tert. - butylphenoxyethoxyethoxyethoxyethoxyethanol, 2-ethylhexyloxyethoxyethoxyethoxyethanol, and similar compounds with larger polyalkoxy chains, such ether alcohols being readily made with multiple ether groups up to twelve or more. In general, the ether alcohols may be represented by the formula, $$R'(OR'')_xOH$$

where R' is a hydrocarbon group, such as an aliphatic, cycloaliphatic, arylaliphatic, aryl, or other hydrocarbon group, R'' is an alkylene chain of two to three carbon atoms, and $x$ is a whole number, preferably from one to five. The group R' is preferably of one to eighteen carbon atoms.

We claim:

1. A process for preparing ketals which comprises reacting between 0° and 75° C. in the presence of a mercury catalyst and a strongly acidic catalyst isopropenyl acetate and a non-tertiary alcohol from the class consisting of (a) alcohols having only the alcoholic hydroxyl radical as a functional group, (b) alcohols having an alcoholic hydroxyl radical and an ether group as the sole functional groups, and (c) alcohols having an alcoholic hydroxyl radical and an ester group as the sole functional groups, said non-tertiary alcohols consisting of carbon, hydrogen, and oxygen, destroying the said acidic catalyst in the reaction mixture, and separating therefrom a ketal.

2. A process for preparing ketals which comprises reacting between 0° and 75° C. in the presence of a catalytic amount of mercuric oxide and a boron trifluoride complex of an oxygenated organic compound forming an ansolvo acid isopropenyl acetate and a non-tertiary alcohol from the class consisting of (a) alcohols having only the alcoholic hydroxyl radical as a functional group, (b) alcohols having an alcoholic hydroxyl radical and an ether group as the sole functional groups, and (c) alcohols having an alcoholic hydroxyl radical and an ester group as the sole functional groups, said non-tertiary alcohols consisting of carbon, hydrogen, and oxygen, treating the reaction mixture with a neutralizing agent to destroy acidity, and separating therefrom a ketal.

3. A process for preparing ketals which comprises reacting between 0° and 75° C. isopropenyl acetate and a saturated, non-tertiary, monohydric alcohol of the formula ROH in which R is an aliphatic hydrocarbon group of one to twelve carbon atoms in the presence of catalytic amounts of mercury oxide and a boron trifluoride catalyst, treating the reaction mixture with an alkaline reagent, and separating therefrom a ketal.

4. A process for preparing ketals which comprises reacting between 0° and 75° C. isopropenyl acetate and a primary, monohydric, alcohol of the formula ROH in which R is an aliphatic hydrocarbon group of one to twelve carbon atoms in the presence of catalytic amounts of mercury oxide and a boron trifluoride catalyst, treating the reaction mixture with an alkaline reagent to destroy acidity in the reaction mixture, and separating therefrom a ketal.

5. A process of preparing dibutyl ketal which comprises reacting between 0° and 75° C. isopropenyl acetate and butyl alcohol in the presence of catalytic amounts of mercury oxide and a boron trifluoride catalyst, treating the reaction mixture with an alkaline reagent to destroy acidity in the reaction mixture, and separating therefrom dibutyl ketal.

6. A process of preparing diethyl ketal which comprises reacting between 0° and 75° C. isopropenyl acetate and ethyl alcohol in the presence of catalytic amounts of mercury oxide and a boron trifluoride catalyst, treating the reaction mixture with an alkaline reagent to destroy acidity in the rection mixture, and separating therefrom diethyl ketal.

WILLARD J. CROXALL.
HARRY T. NEHER.

REFERENCES CITED

The following references are of record in the file of this patent:

UNITED STATES PATENTS

| Number | Name | Date |
|---|---|---|
| 2,229,665 | Mochel | Jan. 28, 1941 |
| 2,422,016 | Hull | June 10, 1947 |
| 2,446,171 | Croxall et al. | Aug. 3, 1948 |
| 2,447,975 | Croxall et al. | Aug. 24, 1948 |
| 2,448,660 | Croxall et al. | Sept. 7, 1948 |

FOREIGN PATENTS

| Number | Country | Date |
|---|---|---|
| 314,646 | Great Britain | July 4, 1929 |